US012802497B2

(12) United States Patent
Amodeo et al.

(10) Patent No.: US 12,802,497 B2
(45) Date of Patent: Nov. 17, 2026

(54) MOTOR VEHICLE WITH COLLISION NOTIFICATION DEVICE

(71) Applicant: FERRARI S.P.A., Modena (IT)

(72) Inventors: Marco Amodeo, Modena (IT); Gianluca Generosi, Modena (IT); Ugo Sitta, Modena (IT); Matteo Fontana, Modena (IT)

(73) Assignee: FERRARI S.P.A. (IT)

(*) Notice: Subject to any disclaimer, the term of this patent is extended or adjusted under 35 U.S.C. 154(b) by 13 days.

(21) Appl. No.: 18/964,060

(22) Filed: Nov. 29, 2024

(65) Prior Publication Data

US 2025/0182536 A1 Jun. 5, 2025

(30) Foreign Application Priority Data

Dec. 1, 2023 (IT) ........................ 102023000025686

(51) Int. Cl.
*G07C 5/02* (2006.01)
*G07C 5/00* (2006.01)
*H04W 52/02* (2009.01)

(52) U.S. Cl.
CPC ............... *G07C 5/008* (2013.01); *G07C 5/02* (2013.01); *H04W 52/0254* (2013.01)

(58) Field of Classification Search
CPC ..... G07C 5/008; G07C 5/02; H04W 52/0254; H04W 52/0216; H04W 52/0229; H04W 52/0235; H04W 52/0251; H04W 52/0274; B60R 25/1012; B60R 25/102; B60R 21/0136; B60R 21/0132; B60R 2021/0104; B60R 2021/01088; B60R 2021/01325
See application file for complete search history.

(56) References Cited

U.S. PATENT DOCUMENTS 6,282,668 B1 * 8/2001 Neudecker ........ H04L 12/40039 713/324
9,457,754 B1 * 10/2016 Christensen ........... G08G 1/205
11,472,361 B2 * 10/2022 Jenkins ............... B60R 16/0234
2004/0169419 A1 * 9/2004 Wagner ................... H02J 7/663 307/112
2010/0268423 A1 * 10/2010 Breed ................ B60R 21/0152 701/45

(Continued)

*Primary Examiner* — Ashley L Redhead, Jr.
(74) *Attorney, Agent, or Firm* — The Belles Group, P.C.

(57) ABSTRACT

A motor vehicle includes a control telecommunication network, an acceleration transducer configured to detect a quantity indicative of an acceleration of the motor vehicle and to generate an acceleration signal corresponding to the detected quantity, a passive safety control unit connected to the control telecommunication network and configured to receive the acceleration signal, determine from the acceleration signal an impact condition when the detected quantity indicates the satisfaction of a predetermined relationship with a threshold associated with said acceleration, and emit first and second impact signals when the impact condition is determined, a transceiver connected to the control telecommunication network and configured to receive the first impact signal and transmit a wake-up signal to the control telecommunication network in response to the reception of the first impact signal, a communication control unit connected to the control telecommunication network, and a wake-up control unit.

11 Claims, 2 Drawing Sheets

(56) References Cited

U.S. PATENT DOCUMENTS

| | | | | |
|---|---|---|---|---|
| 2015/0256135 | A1* | 9/2015 | Coimbra | H03F 3/4521<br>330/253 |
| 2016/0244007 | A1* | 8/2016 | Spesser | B60L 53/00 |
| 2017/0045566 | A1* | 2/2017 | Neudecker | G01R 31/007 |
| 2017/0151922 | A1* | 6/2017 | Obuchi | G07C 5/008 |
| 2020/0384891 | A1* | 12/2020 | Hackner | B60L 58/13 |
| 2020/0408875 | A1* | 12/2020 | Mai | G01S 7/006 |
| 2021/0264693 | A1 | 8/2021 | Rueck et al. | |
| 2022/0292971 | A1* | 9/2022 | Park | G06V 20/586 |
| 2024/0153283 | A1* | 5/2024 | Bilra | G06V 20/597 |

* cited by examiner

MOTOR VEHICLE WITH COLLISION NOTIFICATION DEVICE

CROSS-REFERENCE TO RELATED APPLICATIONS

The present patent application claims priority to Italian Patent Application Serial No. 102023000025686, filed on Dec. 1, 2023, the entire disclosure of which is incorporated herein by reference.

TECHNICAL FIELD

The invention relates to a motor vehicle with a collision notification device.

PRIOR ART

In general, motor vehicles comprise a plurality of components, among which components that can undergo serious damage in the event that a collision with obstacles or other vehicles occurs.

This is particularly true in the specific case of electric motor vehicles, where, for example, damage to the batteries can cause serious fires difficult to manage and extinguish.

The aforementioned damage can further worsen in the event that a motor vehicle subjected to collision is utilized being unaware of the occurred collision, thereby possibly resulting in potential dangerous events for the driver and for the surrounding people or things.

A situation in which this can inadvertently happen is, for example, when the collision occurs during a parking condition of the motor vehicle.

In particular, the situation is even more critical, in the case of an electric motor vehicle, when the parking condition also coincides with a charging condition of the batteries, i.e. a condition in which the motor vehicle is connected to an electric charging device, namely typically a public charging column.

In these situations, the collision occurs in conditions of temporary abandonment of the motor vehicle by the driver, who can then start and even utilize the motor vehicle upon his/her return, remaining anyway unaware of the occurred collision and of the potential damage it caused.

The known equipment for detecting collisions to which a vehicle is subjected is not sufficiently satisfactory for determining and signaling an occurred collision in the absence of the driver with the parked vehicle.

For example, some known motor vehicles are provided with frontal impact sensors, the operation of which typically provides for the emission of a signal corresponding to the detection of the coming out of a mechanical element from a specially provided seat, where the coming out can occur only in the case of a frontal impact, i.e. along a roll axis of the motor vehicle, having a greater extent than a significance threshold.

Such frontal impact sensors are connected to a communication control unit via the Controller Area Network (CAN) of the motor vehicle; however, the communication control unit can receive from the Controller Area Network (CAN) and thus process the signal of the impact sensors only when it is actually turned on, namely not in a sleep or stand-by mode.

On the other hand, the communication control units in the known motor vehicles are typically in sleep mode when parked and temporarily abandoned by the driver, as well as all the other control units thereof adapted to process power signals.

A wake-up of the assembly of the control units adapted to process power signals can typically occur via a use of the vehicle key by the driver, namely during the so-called key-on state.

Therefore, an occurred collision could be communicated to the driver only when the key-on state takes over.

Alternatively, in some known motor vehicles, one or more wake-ups of the control units are programed in an automated manner for the execution of diagnostic activities based on a passed idle time by the control units starting from an entering thereof in the sleep mode.

In these cases, the communication control unit could actually process the signal of the frontal impact sensors upon its programed wake-up. However, in the event that the collision occurs at the beginning of the idle time, the potential signaling of such collision would anyway occur with great delay relative to the moment of the occurrence.

Therefore, the need is felt to improve the known motor vehicles; more in particular, the need is felt to configure the known motor vehicles so that possible collisions occurred in parking conditions can be promptly signaled.

An object of the invention is to satisfy at least one of the above-mentioned needs, preferably in a simple and reliable manner.

DESCRIPTION OF THE INVENTION

The object is achieved by a motor vehicle according to claim 1.

The dependent claims set forth particular embodiments of the invention.

BRIEF DESCRIPTION OF THE DRAWINGS

In the following, an embodiment of the invention is described for a better understanding thereof, by way of non-limiting example and with reference to the accompanying drawings, wherein.

EMBODIMENTS OF THE INVENTION

Figure 1:
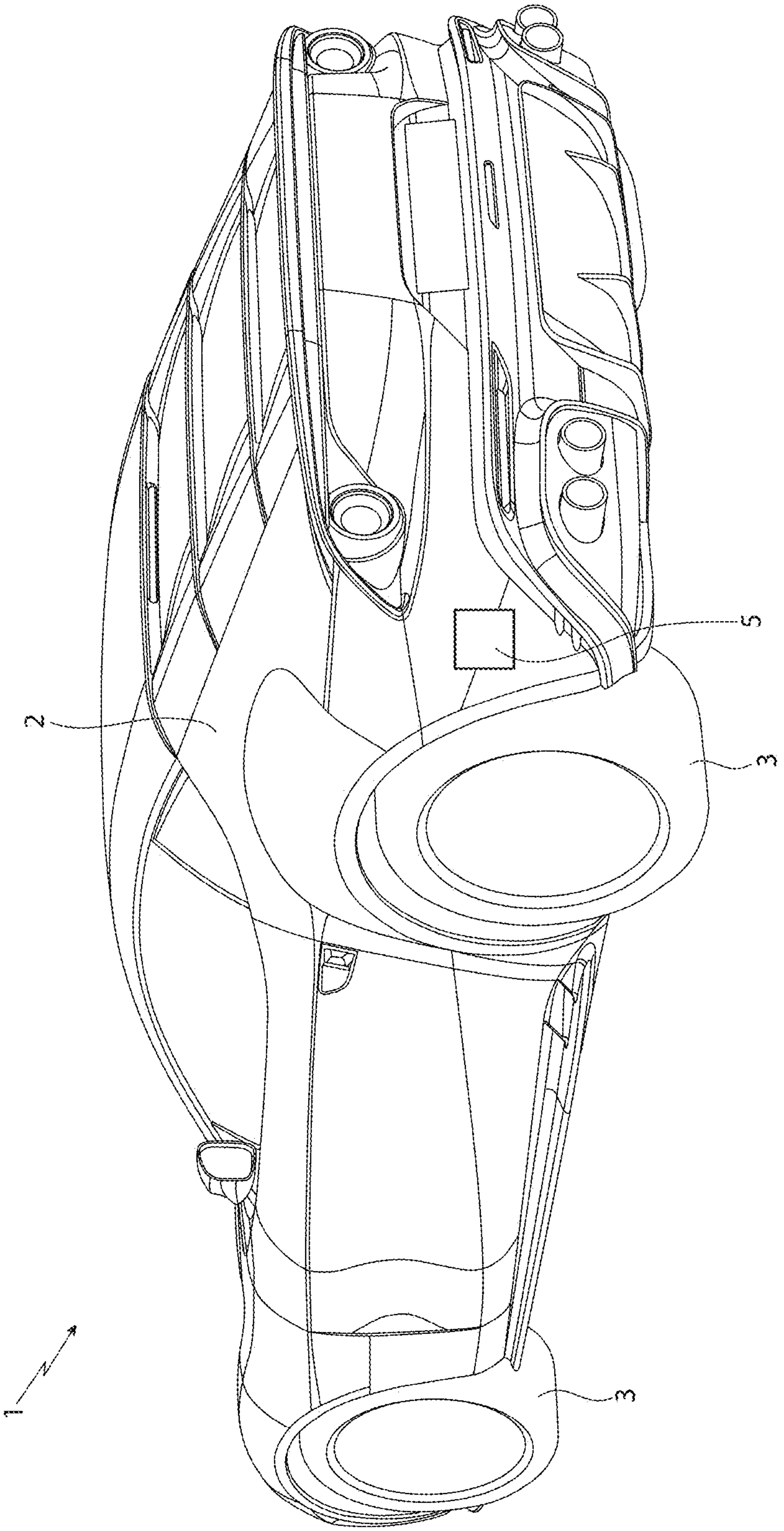
FIG. 1 is a perspective view of a motor vehicle according to the invention.
Figure 2:
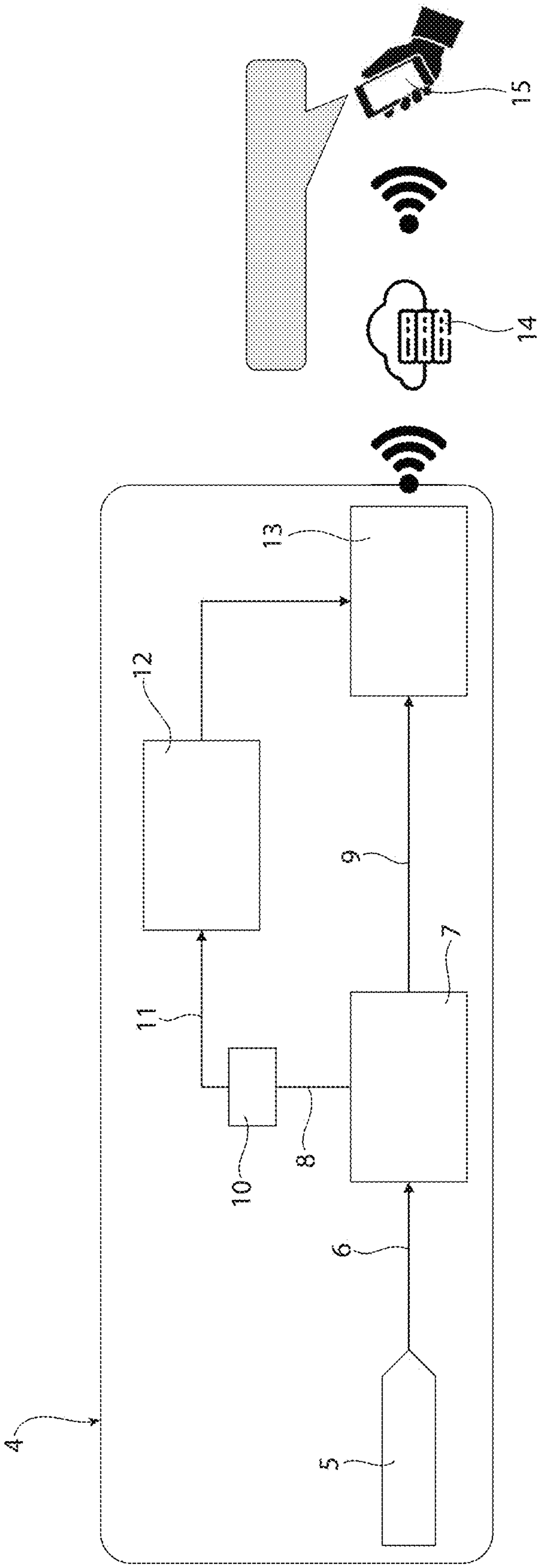
FIG. 2 is a block diagram which illustrates the operation of a signaling apparatus of the motor vehicle of FIG. 1.

In FIG. 1, reference numeral 1 is used to indicate, as a whole, a motor vehicle.

The motor vehicle 1 comprises a body 2, a plurality of wheels 3, and suspensions not illustrated which suspend the body 2 relative to the wheels 3.

Alternatively or additionally, the motor vehicle 1 has an unsprung mass and a suspended mass; the latter is suspended relative to the unsprung mass via the suspensions.

Therefore, the wheels 3 are part of the unsprung mass, whereas the body 2 is part of the suspended mass.

The motor vehicle 1 further comprises a control telecommunication network 4.

In particular, the network 4 carries the electronic signals of the motor vehicle 1 and interconnects a plurality of control units of the motor vehicle 1 between one another.

More specifically, the network 4 is a so-called Controller Area Network (CAN), therefore the following description will particularly refer to such Controller Area Network (CAN) without any loss of generality.

Furthermore, the motor vehicle 1 comprises a transducer 5 configured to detect a quantity indicative of an acceleration of the motor vehicle 1.

The acceleration indicated by the quantity can be referred relative to a stationary state of the motor vehicle 1, i.e. a state in which the motor vehicle 1 is still, namely a state in which the speed of the motor vehicle 1 is, in other words, null.

Alternatively or additionally, the acceleration indicated by the quantity can be the acceleration of the body 2 relative to the wheels 3, namely of the suspended mass relative to the unsprung mass.

The acceleration indicated by the quantity can be a vector, or a scalar with reference to a specific axis or direction, for example fixed to the body 2 although not necessarily.

In fact, the acceleration can comprise a component directed along the direction of the acceleration of gravity, in the event that the acceleration is a vector, or can be defined along the direction of the acceleration of gravity, in the event that the acceleration is a scalar.

The axis or direction fixed to the body 2 could be, for example, one between the roll axis, the pitch axis, and the yaw axis of the motor vehicle 1.

In the event that the acceleration is a vector, the same acceleration or the vector could be referred relative to an orthogonal Cartesian reference system, for example fixed to the body 2, which could be bi-dimensional (on a plane, for example of the body 2) or more preferably three-dimensional.

For example, the reference system could be defined by a body reference system defined by two or all between the roll axis, the pitch axis, and the yaw axis, or anyway be ascribable to the body reference system generically by means of a roto-translation.

The quantity could be directly the acceleration or a quantity indirectly correlated with the acceleration via a one-to-one relationship and therefore indicative of the acceleration. For example, the quantity could be an electric quantity, such as a current or a voltage, based on the type of the transducer 5.

In the event that the acceleration indicated by the quantity is a vector, also the same quantity will be vectorial.

For example, the transducer 5 comprises one or more accelerometers, or an inertial measurement unit, in particular configured to determine the quantity, in this case indicative of the acceleration in vector form relative to an orthogonal Cartesian reference system, more in particular three-dimensional, for example fixed to the body 2.

The transducer 5 is configured to generate an acceleration signal 6 corresponding to the detected quantity.

Preferably, the signal 6 is an electric signal emitted or input on the network 4. Here, the transducer 5 would be connected to the network 4.

The signal 6 corresponds to the detected quantity as it carries or transmits a piece of information related to the detected quantity; the piece of information, in other words, allows tracing back to the detected quantity.

The motor vehicle 1 further comprises a passive safety control unit 7 connected to the network 4.

The passive safety control unit 7 is permanently supplied, in particular by a battery of the motor vehicle 1, for example with low electric power. In other words, the passive safety control unit 7 is always operational, regardless of the operating conditions of the motor vehicle 1.

In particular, the passive safety control unit 7 has a quiescent current equal to or less than a quiescent current threshold, for example less than or equal to 150 mA.

More specifically, the passive safety control unit 7 is operational also when the motor vehicle 1 is in the stationary state or in a parking condition or state, namely when the motor vehicle 1 is parked and therefore turned off.

The passive safety control unit 7 is configured to receive the signal 6, for example via the network 4 or via a dedicated network which couples the transducer 5 to the passive safety control unit 7 in a manner independent of the network 4.

Therefore, the transducer 5 is not necessarily connected to the network 4, but it could be coupled to the passive safety control unit 7 via an alternative network, optionally wired or wireless, such that the passive safety control unit 7 receives the signal 6.

The passive safety control unit 7 is configured to process the signal 6, from which it determines an impact condition, in which the motor vehicle 1 has been impacted by a generic entity, for example an object, a living being, or another vehicle.

The passive safety control unit 7 in fact extracts the piece of information carried by the signal 6 concerning the quantity detected by the transducer 5 and indicative of the acceleration undergone by the motor vehicle 1, in particular by the stationary condition or state, for example the parking condition or state.

On the basis of the extracted piece of information, the passive safety control unit 7 is capable of determining when the quantity detected by the transducer 5 indicates that the acceleration undergone by the motor vehicle 1 satisfies a predetermined relationship with a threshold associated with the same acceleration.

Here, namely when the passive safety control unit 7 determines that the predetermined relationship is satisfied, the same passive safety control unit 7 determines the impact condition, namely its occurrence.

In particular, the satisfaction of the predetermined relationship consists in the exceeding of a threshold by the acceleration or a component thereof, in the event that the acceleration is in vector form.

In fact, when the acceleration indicated by the quantity detected by the transducer 5 is a vector, the threshold can also be conceptually definable by an acceleration vector, so that the exceeding of the threshold can consist, for example, in the fact that all the components of the vector acceleration exceed the corresponding components of the vector threshold or, alternatively, that any one of the components of the vector acceleration exceeds a corresponding component of the vector threshold.

Alternatively, still when the acceleration indicated by the quantity detected by the transducer 5 is a vector, the threshold could be a scalar, so that the exceeding of the threshold consists in the fact that a specific one or any one between the components of the vector acceleration exceeds the scalar threshold. For example, the specific one between the components of the vector acceleration could be the one directed along the direction of the acceleration of gravity or the one directed along one between the roll axis, the pitch axis, or the yaw axis of the motor vehicle 1.

Still alternatively, when the acceleration indicated by the quantity detected by the transducer 5 is a scalar, the threshold will be a corresponding scalar to be exceeded for the satisfaction of the predetermined relationship.

Preferably, the threshold has a modulus less than 60 m/s^2 (or approximately 6G) or more preferably less than 50 m/s^2 (or approximately 5G).

Alternatively o additionally, the threshold conveniently has a modulus greater than 18 m/s^2 (or approximately 2G) or more preferably greater than 27 m/s^2 (or approximately 3G).

Clearly, should the threshold be scalar or a component of a vector threshold, the modulus would coincide with the value of the scalar defining the threshold.

The passive safety control unit 7 is configured to emit at least a first impact signal 8 and, as it will be evident in the following, a second impact signal 9 when the impact condition is determined by the same passive safety control unit 7.

According to embodiments not illustrated, the first and the second impact signals could also coincide, without any loss of generality. In fact, numerical adjectives such as first, second, and the like have in this text a clarifying but non-limiting value, in particular non-limiting relative to the number or the order of the features to which they are attributed.

The second impact signal 9 is emitted on the network 4.

The first impact signal 8 is preferably a signal of digital type, more in particular with binary coding.

The second impact signal 9 could be a power signal.

The motor vehicle 1 further comprises a transceiver 10 connected to the network 4 and configured to receive the first impact signal 8 and transmit a wake-up signal 11 to the network 4 in response to the reception of the first impact signal 8, i.e. when it receives the first impact signal 8.

More specifically, the transceiver 10 comprises a receiving portion coupled to the passive safety control unit 7, for example via the network 4 or directly or indirectly via a dedicated (even wireless) network, and a transmitting portion connected (even wirelessly) to the network 4 for transmitting the wake-up signal 11 to it.

The receiving portion receives and interprets the first impact signal 8, thereby activating the transmitting portion when the first impact signal 8 is interpreted for the transmission of the wake-up signal 11 to the network 4.

In operation, the wake-up signal 11 circulates on the network 4 when the impact condition occurs, regardless of the operating condition of the motor vehicle 1, namely also when the motor vehicle 1 is in the stationary state, for example in a parking condition and/or turned off.

The motor vehicle 1 further comprises a wake-up control unit 12 configured to pick up the wake-up signal 11 from the network 4.

The wake-up control unit 12 is further configured to activate or execute a wake-up procedure via the network 4 in response to the picking up of the wake-up signal 11, namely when it picks up the wake-up signal 11.

The wake-up procedure causes at least one further control unit of the motor vehicle 1 connected to the network 4, in particular a communication control unit 13, and more preferably all the control units of the motor vehicle 1 connected to the network 4, to wake up.

The passive safety control unit 7 and at least the receiving portion of the transceiver 10 are part of a circuit configured to operate with a lower supply power than the one utilized for the overall operation of the wake-up control unit 12 and of the communication control unit 13.

The wake-up procedure imposes the supply of the control units and specifically of the communication control unit 13.

The wake-up coincides with the passage from an idle state, for example a sleep or stand-by state, in which the control units do not carry out their functions, to a wake-up state, in which the control units normally carry out their functions.

In the activity state, the supply power of the control units is much higher than the one provided (for example null or substantially null) for supplying the control units in the idle state.

In particular, during the stationary or parking state of the motor vehicle 1, the communication control unit 13 is in the idle state, unless the wake-up control unit 12 has executed the wake-up procedure during the stationary state due to the impact condition. In the latter case, the communication control unit 13 is brought back to the wake-up state, for example temporarily, in particular until a predetermined time interval ends, after which the communication control unit 12 returns to the idle state, if the stationary state is maintained during the predetermined time interval.

The communication control unit 13 is generally configured (in the wake-up state) to emit radio communication signals outside the motor vehicle 1.

The communication control unit 13 is configured in the wake-up state to pick up the second impact signal 9 from the network 4 and to emit a specific radio communication signal outside the motor vehicle 1 in response to the picking up of the second impact signal 9, namely when it picks up the second impact signal 9 from the network 4.

The specific radio communication signal carries a piece of information associated with the impact condition, so that an entity receiving the specific signal identifies the impact condition.

The communication control unit 13 could send the specific radio communication signal to a processing device 14 (for example a server) communicating with a public service, such as a police, fire brigade service, and the like, or with a private operator, for example having the task of warning, by phone or via other computer means, the owner or the driver of the motor vehicle 1 of the occurred impact condition.

Alternatively or additionally, the communication control unit 13 could send the specific radio communication signal (for example via the device 14) to a processing device 15 directly communicating with the owner or a driver of the motor vehicle 1 (for example a mobile phone device, a fixed or portable computer, an email system, and the like).

The processing device or the processing devices 14, 15 could together with the motor vehicle 1 be part of a signaling system for signaling the impact condition to a user, la latter being either a public, private service or the owner or driver of the motor vehicle 1.

The transducer 5, the network 4, the passive safety control unit 7, the wake-up control unit 12, and the communication control unit 13 are part of a collision notification device configured to notify or signal the impact condition to the user.

Based on the foregoing, the advantages of the motor vehicle 1 according to the invention are evident.

The motor vehicle 1 is in fact capable of effectively and promptly signaling the occurrence of the impact condition, even should the motor vehicle 1 be in the stationary state, in the absence of a driver.

In order to do so, the motor vehicle 1 does not require for the communication control unit 13 to always be in the wake-up state for picking up the second impact signal 9. On the contrary, the communication control unit 13 can be in the idle state at the moment of the occurrence of the impact condition; in fact, the communication control unit 13 is, at that point, woken up by the wake-up procedure executed by the wake-up control unit 12 and controlled by the passive safety control unit 7 via the transceiver 10.

The passive safety control unit 7 is a component with a negligible consumption of electric power relative to the communication control unit 13, therefore the signaling process of the impact condition is not particularly costly.

Furthermore, permanently supplied components and the like from the point of view of the consumption of electric power to the passive safety control unit 7 are already provided in the known motor vehicles for executing other passive safety functions, such as for example the volumetric anti-theft control or the airbag actuation, which do not require the waking up of the control units of the motor vehicle 1.

Finally, it is clear that modifications and variations can be made to the motor vehicle 1 according to the invention, which anyway do not depart from the scope of protection defined by the claims.

What is claimed is:

1. A motor vehicle, comprising:

a control telecommunication network:

an acceleration transducer configured to detect a quantity indicative of an acceleration of the motor vehicle and to generate an acceleration signal corresponding to the detected quantity;

a passive safety control unit connected to the control telecommunication network and configured to receive the acceleration signal generated by the acceleration transducer, determine from the acceleration signal an impact condition when the detected quantity indicates the satisfaction of a predetermined relationship with a threshold associated with said acceleration, and emit a first and a second impact signal when the impact condition is determined, the second impact signal being emitted on the control telecommunication network;

a transceiver connected to the control telecommunication network and configured to receive the first impact signal and transmit a wake-up signal to the control telecommunication network in response to the reception of the first impact signal;

a communication control unit connected to the control telecommunication network; and a wake-up control unit configured to pick up the wake-up signal from the control telecommunication network and to execute via the control telecommunication network a wake- up procedure causing the communication control unit to wake up, so that the communication control unit goes from an idle state to a wake-up state, in response to the picking up of the wake- up signal;

wherein the communication control unit is configured in the wake-up state to pick up the second impact signal from the control telecommunication network and to emit a radio signal outside the motor vehicle in response to the picking up of the second impact signal.

2. The motor vehicle according to claim 1, wherein said threshold has a modulus less than 60 m/s^2.

3. The motor vehicle according to claim 1, wherein said threshold has a modulus greater than 18 m/s^2.

4. The motor vehicle according to claim 1, wherein said acceleration comprises a component directed along the direction of the acceleration of gravity.

5. The motor vehicle according to claim 1, wherein said acceleration is directed along an axis fixed to a body of the motor vehicle.

6. The motor vehicle according to claim 5, wherein the fixed axis is one between the roll axis, the pitch axis, and the yaw axis of the motor vehicle.

7. The motor vehicle according to claim 1, wherein said acceleration is defined by a vector referred to an orthogonal Cartesian reference system fixed to a body of the motor vehicle.

8. The motor vehicle according to claim 7, wherein the Cartesian reference system is three-dimensional.

9. The motor vehicle according to claim 1, wherein the passive safety control unit has a quiescent current less than or equal to a quiescent current threshold.

10. The motor vehicle according to claim 9, wherein the quiescent current threshold is less than or equal to 150 mA.

11. The motor vehicle according to claim 1, further comprising a plurality of wheels, a body, and suspension means suspending the body relative to the wheels, wherein said acceleration is an acceleration of the body relative to the wheels.

* * * * *